June 12, 1956 — L. S. BILLMAN ET AL — 2,749,749

MACH METER

Filed March 30, 1954 — 2 Sheets-Sheet 1

INVENTORS
LOUIS S. BILLMAN
ARTHUR C. ANGELAS

BY
ATTORNEYS

June 12, 1956   L. S. BILLMAN ET AL   2,749,749
MACH METER
Filed March 30, 1954   2 Sheets-Sheet 2
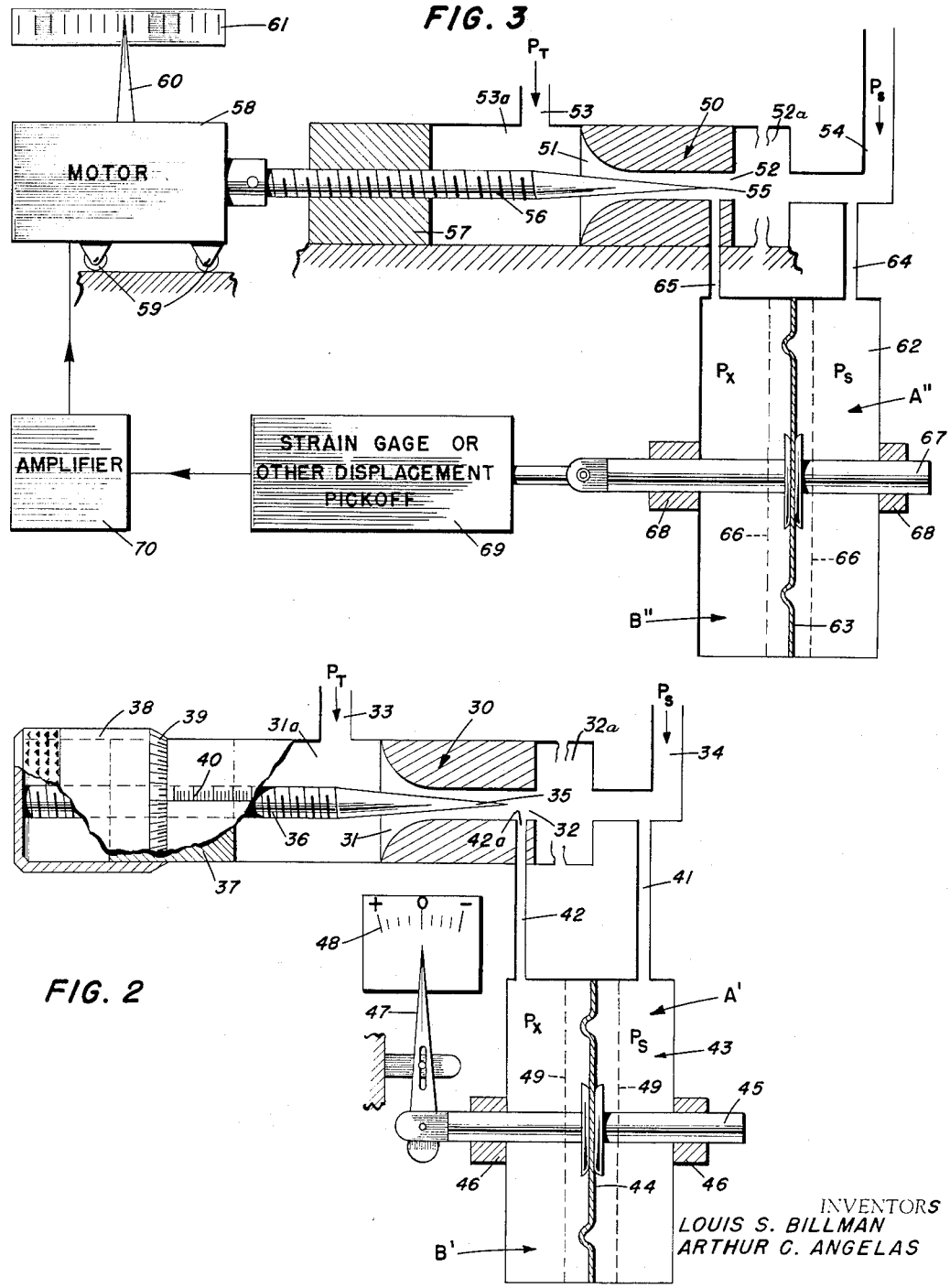
INVENTORS
LOUIS S. BILLMAN
ARTHUR C. ANGELAS

United States Patent Office 2,749,749
Patented June 12, 1956

2,749,749

MACH METER

Louis S. Billman, Fort Worth, Tex., and Arthur C. Angelos, Glastonbury, Conn., assignors, by mesne assignments, to the United States of America as represented by the Secretary of the Navy Application March 30, 1954, Serial No. 419,938

8 Claims. (Cl. 73—182)

This invention relates to an airflow measuring instrument and more particularly to a meter for indicating directly the true speed of fluid flowing over a surface as indicated by static pressure and total pressure behind a normal shock front.

Due to difficult control situations and structural stresses which occur in the testing of aerofoils at or above the speed of sound and because of the failure of conventional airspeed indicators to obtain accurate speed determinations in a supersonic stream because the incompressibility formulae of static pressure, total pressure, density, speed, etc. encountered for subsonic flow do not hold true for compressibility experienced during supersonic flow, convenitional pitot tube measurements which depend on incompressible flow have proved to be invalid when used in supersonic measurement studies.

Therefore, it is an object of this invention to provide an instrument which will give a direct indication of the flow rate of a supersonic air stream over a surface.

A further object of this invention is to provide a direct reading Mach meter which will give an indication of the Mach number corresponding to the airflow over a surface.

Another object of the present invention is to provide a direct reading Mach meter which obviates the need for separate power control or computers which normally require a correlation of data obtained at various points throughout an air stream.

Still another object of the present invention is to provide a direct reading Mach meter having means for ready adjustment to permit the Mach number to be conveniently read on a calibrated scale.

A further object is to provide a direct reading electropneumatic Mach meter incorporating an amplifier and suitable control means to maintain a selected Mach reading.

Still another object is to provide a simple, direct reading, airflow measuring instrument which will accurately record the resultant Mach number as indicated by the summation of the static pressure and total pressure behind a normal shock front.

Other objects and many of the attendant advantages of this invention will be readily appreciated as the same becomes better understood by reference to the following detailed description when considered in connection with the accompanying drawings wherein:

Fig. 2 is a diagrammatic longitudinal sectional view of an embodiment wherein manual adjustment means has been provided to vary the position of a normal shock in the nozzle;

Fig. 3 is a diagrammatic longitudinal sectional view of an embodiment wherein electropneumatic operating means is employed to control the position of a normal shock;

and the Mach number, wherein $$\frac{P_{ty}}{P_s}=\left(1+\frac{\lambda-1}{2}M_{y}^{2}\right)^{\frac{\lambda}{\lambda-1}}$$

and $M_0=f(M_y)$.

By directing an air stream of sufficiently high velocity through a convergent-divergent nozzle a shock front will be produced in the nozzle and by providing a means for correlating the inlet impact pressure and the chamber static pressure with the nozzle pressure a movement corresponding to the resultant pressure ratio may be transmitted through an appropriate linkage means so that the Mach number may be read directly from a calibrated scale associated with the linkage means.

Derivation of the mathematical relationship of $$\frac{P_{ty}}{P_s}=\left(1+\frac{\lambda-1}{2}M_{y}^{2}\right)^{\frac{\lambda}{\lambda-1}}$$

is obtained from the relationships of velocity of flow $V=cM$, and the representation for the speed of sound, where $c=\sqrt{\gamma RT}$ and the universal gas law is $P_s=\rho RT$ where:

$P_{ty}=$stagnation or stop pressure of the free stream, i. e. the pressure which is generated in bringing the free stream to a dead stop
$P_t=$total pressure behind normal shock
$P_s=$ambient static pressure
$M_y=$Mach number behind the normal shock
$M_0=$free stream Mach number
$\gamma=$specific heat ratio
$\rho=$density of air
$V=$velocity of flow
$R=$universal gas constant
$T=$static temperature
$c=$speed of sound When a convergent-divergent nozzle is operating above the critical pressure ratio, that is $$\frac{P_t}{P_s}$$

is greater than 1.893, the Mach number obtained at the throat in a nozzle is sonic, that is $M_0=1.0$, and supersonic flow will occur downstream of the nozzle throat. A normal shock front will be established as required by the flow conditions and downstream resistance. As the relationship of $$\frac{P_t}{P_s}$$

is increased the normal shock will be moved or pushed downstream of the nozzle past a pressure tap which communicates with the interior of the nozzle and is represented by $P_x$.

Figure 1:
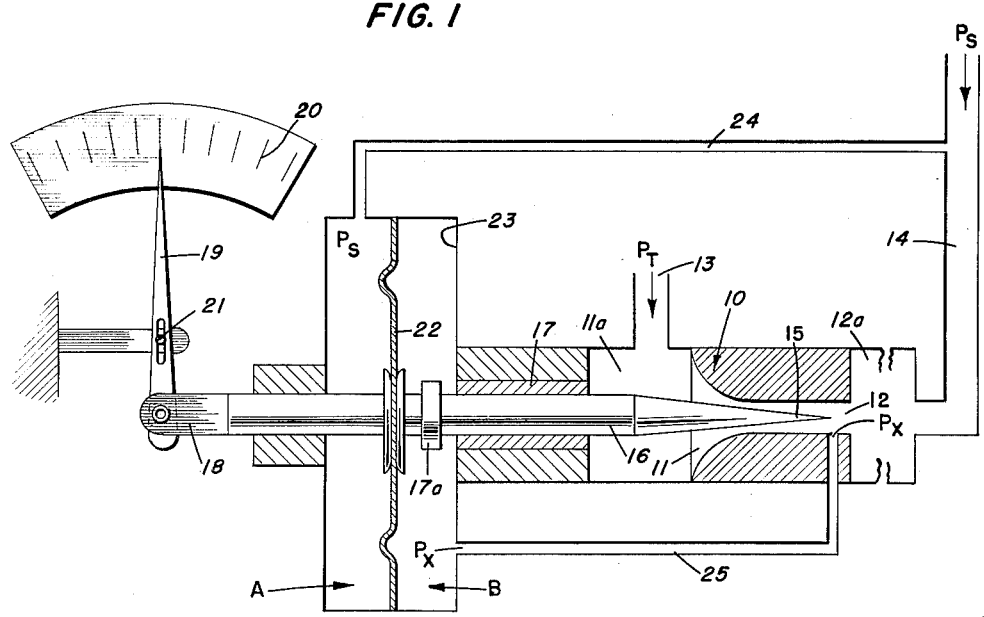
Fig. 1 is a diagrammatic longitudinal sectional view of one embodiment of a Mach meter incorporating the present invention as employed with a fluid flow apparatus.
Figure 4:
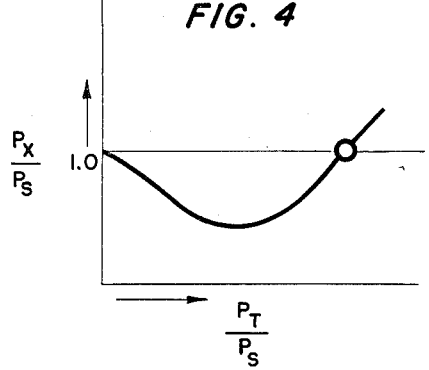
Fig. 4 is a graph showing the relationship of $$\frac{P_x}{P_s} \text{ and } \frac{P_t}{P_s}$$
Figure 5:
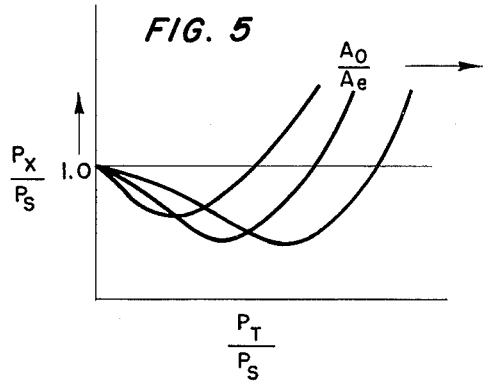
Fig. 5 is a graph showing sample curves obtainable as the area ratio of the nozzle is changed.
Figure 6:
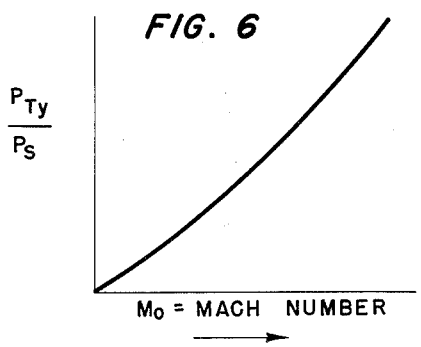
Fig. 6 is a chart showing the relationship between $$\frac{P_{ty}}{P_s}$$

In the embodiment illustrated in Fig. 1 there is shown a convergent-divergent nozzle 10 having an inlet 11 within a suitable settling chamber 11a and an outlet 12 downstream which leads into a suitable test chamber 12a in which a suitable model or aerofoil may be mounted for test purposes in a supersonic stream passing from the outlet 12. The inlet 13 to the settling chamber is subjected to a high velocity inlet stream having a total pressure $P_t$ which will be the pressure measured behind the normal shock formed within the nozzle 10. The oulet 12 of the nozzle will direct airflow through the chamber 12a to which a conduit 14 is connected to exhaust the flow to ambient static pressure $P_s$.

In this embodiment the pointed end 15 of a needle valve stem 16 aligned coaxially with the nozzle is housed in a suitable slide bearing 17, the valve stem 16 having a stop collar 17a thereon. The opposite end 18 of the stem is linked with the lower end of a pointer 19 which sweeps over the indicia on a scale 20. This pointer is pivoted at 21 by a suitable pin and slot arrangement.

Intermediate the ends of the needle valve stem is mounted a flexible diaphragm 22 located within a chamber 23 so as to divide the chamber into portions A and B. As illustrated chamber A is subjected to the ambient static pressure $P_s$ through a conduit 24 and chamber B is subjected to the pressure shock in the nozzle outlet $P_x$ by means of the conduit 25 leading to the downstream side of the nozzle 10.

In the embodiment of Fig. 1 the pointer 19 is automatically positioned on the calibrated scale 20 at a point which will be determined by the resultant force of the relative pressures acting in the chambers A and B, that is, when $$\frac{P_x}{P_s}=1.0$$

and $$P_x-P_s=0$$

thereafter, for each Mach number and pressure ratio $$\frac{P_t}{P_s}$$

there is an equilibrium position of the stem 16 and the pointer 19 which will indicate directly on the scale 20 the corresponding value of the Mach number. Thus, it will be understood that it is the velocity of the air at the entrance to conduit 25 in the nozzle outlet which is indicated by pointer 19 on scale 20. The precise location of the entrance to conduit 25 is unimportant except that it must be downstream from the throat of the nozzle. The calibration of the device compensates for any change in the location of the entrance to conduit 25.

In the embodiment illustrated in Fig. 2 the nozzle 30 is provided with an inlet 31 adjacent the settling chamber 31a and an outlet 32 adjacent the test chamber 32a, the inlet being subjected to the total entering pressure $P_t$ through the conduit 33 and the outlet being subjected to the ambient static pressure $P_s$ through the conduit 34. The point 35 of a longitudinally adjustable needle valve stem 36 is disposed axially of the nozzle and the stem 36 is threaded into a nut 37 which has a nut encompassing thimble 38, which, if desired, may be graduated at 39 to provide a micrometer type reading on the scale 40 to indicate the relative axial position of the point 35 of the stem 36 with relation to the position in the nozzle. As described in the previous embodiment, there is provided a chamber A' which is connected to the ambient static pressure $P_s$ through a tube 41, and chamber B' that is connected to the downstream portion of the nozzle through a conduit 42. Pressure transmitted from the opening 42a in the nozzle to the chamber B' represents pressure $P_x$ downstream in the nozzle 30. Pressures in these two portions of chamber 43 act upon the diaphragm 44 to move the centrally attached shaft 45 axially in bearings 46 so as to shift a pointer 47 over a calibrated scale 48. If desired perforated plates 49 may be mounted on opposite sides of the diaphragm to limit maximum diaphragm movement. Diaphragm deflection produced by a resulting pressure differential between chambers A and B will pivot the pointer to either side of the equilibrium position as represented by the zero mark on the calibrated scale 48.

In the use of the embodiment illustrated in Fig. 2 the point 35 of the stem 36 is adjusted manually by rotating the thimble 38 until the pointer 47 shows a pressure differential of zero on the scale 48 indicating that the ratio of $$\frac{P_t}{P_s}=1.0$$

and when the meter is placed in operation the Mach number can then be read directly from the thimble.

In Fig. 3 there is illustrated still another form of the present invention wherein a nozzle 50 has at its inlet 51 the inlet air stream having a total pressure of $P_t$ which passes through a conduit 53 into the settling chamber 53a. The outlet 52 of the nozzle is subjected to the ambient static pressure $P_s$ as the air stream leaves the test chamber 52a to pass through the conduit 54.

The pointed end 55 of an adjustable needle valve stem 56 is located for axial movement into and out of the nozzle 50 by the threaded engagement with nut 57 positioned adjacent the settling chamber 53a. The needle valve stem 56 is adjusted by rotation caused by operation of an electric motor 58 which as shown, is suitably supported as by wheels 59 so that it will travel longitudinally with such rotation to carry a pointer 60 along a calibrated indicating scale 61. Of course any suitable means for permitting relative movement of the parts may be employed. As in the previous two embodiments, described above, there is provided a chamber 62 centrally divided by a flexible diaphragm 63 into chambers A" and B", chamber A" being connected by conduit 64 indicative of the ambient static pressure $P_s$ and chamber B" being connected by conduit 65 communicating with the downstream section of the nozzle 50 so as to transmit the resulting pressure $P_x$ from adjacent the shock front which will occur within the nozzle.

The diaphragm 63 may be disposed between perforated plates 66 to limit maximum movement thereof and is mounted on a shaft 67 to axially shift that shaft in bushings 68. Differential pressures exerted on the diaphragm 63 will influence a strain gage or other displacement pick-off 69 to provide a signal through a suitable amplifier 70 for controlling a driving current which will be supplied to the motor 58 which motor then rotates the stem 56 and moves the point 55 thereof axially into or out of the nozzle 50 to vary the nozzle throat area so as to shift the normal shock front upstream or downstream. It will be apparent that with this construction the control circuit provided will automatically operate the motor so as to move the pointer 60 along the indicator scale 61 to give a direct reading of the actual Mach number.

Obviously many modifications and variations of the present invention are possible in the light of the above teachings. It is therefore to be understood that within the scope of the appended claims the invention may be practiced otherwise than as specifically described.

What is claimed is:

1. A direct reading meter for determining true Mach number comprising: a chamber, a nozzle communicating with said chamber, said nozzle having an inlet exposed to total pressure behind a normal shock and an outlet exposed to ambient static pressure, means movable relative to said nozzle to vary the effective throat area thereof and to control the position of a normal shock wave downstream of the nozzle throat, means including a diaphragm subjected on one side to said ambient static pressure and on the other side to the pressure within said nozzle downstream from the throat for varying the nozzle throat area in response to variations in pressure on opposite sides of said diaphragm, and means for indicating movement of said nozzle varying means whereby a true Mach reading may be obtained.

2. A meter for determining true Mach number comprising; a chamber, a convergent-divergent nozzle communicating with one end of said chamber, said nozzle having an inlet exposed to total pressure of an incoming air stream and an outlet exposed to ambient static pressure, means movable relative to said nozzle to vary the effective throat area thereof and to control the position or a normal shock wave downstream of the nozzle throat, and means including a diaphragm subjected on one side to said ambient static pressure and on the other side to the pressure within said nozzle downstream from the throat for indicating equilibrium of said pressures.

3. A meter for determining true Mach number comprising; a chamber, a nozzle communicating with said chamber, said nozzle having an inlet exposed to total pressure behind normal shock and an outlet exposed to ambient static pressure, means movable relative to said nozzle to vary the effective throat area thereof and to control the position of a normal shock wave downstream of the nozzle throat, means including a diaphragm subjected on one side to said ambient static pressure and on the other side to the pressure within said nozzle downstream from the throat for indicating equilibrium of said pressures, and means for adjusting the nozzle throat varying means.

4. A direct reading meter for determining true Mach number comprising; a chamber, a convergent-divergent nozzle communicating with said chamber, said nozzle having an inlet to receive flow from said chamber and an outlet exposed to ambient static pressure, means movable axially within said nozzle to vary the effective throat area thereof and to vary the position of a normal shock wave in the nozzle, means including a diaphragm subjected on one side to said ambient static pressure and on the other side to the pressure within said nozzle downstream from the throat for varying the nozzle throat area in response to variations in pressure on opposite sides of said diaphragm, and means for indicating movement of said nozzle varying means whereby a true Mach reading may be obtained.

5. A direct reading meter for determining true Mach number comprising; a nozzle having an inlet exposed to total pressure of an air stream and an outlet exposed to ambient static pressure, nozzle throat varying means movable axially into and out of the nozzle throat area to vary the effective throat area thereof and to control the position of a shock wave downstream of the nozzle throat, and means for moving said nozzle throat area varying means into and out of the throat area to vary said throat area including a diaphragm subjected on one side to said ambient static pressure and on the other side to the pressure within said nozzle downstream from the throat whereby the nozzle throat area is controlled by the resultant force produced by the pressures acting on opposite sides of the diaphragm.

6. A direct reading meter for determining true Mach number comprising; a nozzle having an inlet exposed to the total pressure of an air stream and an outlet exposed to ambient static pressure, a valve stem disposed axially of said nozzle and having a tapered portion movable into and out of the nozzle throat to vary the effective throat area, a diaphragm mounted on said valve stem and subjected on the nozzle side thereof to the pressure within said nozzle downstream from the throat and subjected on the opposite side thereof to ambient static pressure whereby variations in pressure differential shifts said valve stem axially to vary the effective nozzle throat area, and means including a pointer and scale for indicating the position of said valve stem.

7. A direct reading meter for determining true Mach number comprising; a nozzle having an inlet exposed to the total pressure of an air stream and an outlet exposed to ambient static pressure, means defining adjacent pressure chambers and connecting means for connecting one of said pressure chambers to the total pressure of the air stream via a path including said nozzle and connecting another of said pressure chambers via another path to the ambient static pressure, means actuated in response to and in accordance with pressure differentials being established between said chambers for creating an electrical signal proportional to pressure differentials between said chambers and for converting said signal into a control current, power operated nozzle throat area varying means electrically connected to said last-mentioned means and operated by said control current to alter the effective throat area of said nozzle in response to pressure differentials established between said chambers, and indicating means connected to said throat area varying means for directly indicating the true Mach number of the airflow over a surface.

8. A meter for determining true Mach number comprising; a nozzle having an inlet exposed to total pressure of a fluid stream and an outlet exposed to ambient statics pressure, means for varying the effective throat area of said nozzle, pressure responsive means subjected to ambient static pressure and to pressure within said nozzle downstream from the throat and connected to said throat varying means for controlling the latter in accordance with differentials in pressure established within said pressure responsive means, and indicating means connected to said throat varying means for indicating the true Mach number of the airflow over a surface.

References Cited in the file of this patent

UNITED STATES PATENTS

| | | |
|---|---|---|
| 2,367,544 | Udale | Jan. 16, 1945 |
| 2,592,176 | Orlin et al. | Apr. 8, 1952 |
| 2,609,831 | MacGeorge | Sept. 9, 1952 |